US012123387B2

(12) United States Patent
Richards

(10) Patent No.: US 12,123,387 B2
(45) Date of Patent: Oct. 22, 2024

(54) COVER APPARATUS FOR DIRECTING WATER FLOW AROUND A WATERWHEEL

(71) Applicant: David A. Richards, Sturgis, SD (US)

(72) Inventor: David A. Richards, Sturgis, SD (US)

( * ) Notice: Subject to any disclaimer, the term of this patent is extended or adjusted under 35 U.S.C. 154(b) by 0 days.

(21) Appl. No.: 18/512,221

(22) Filed: Nov. 17, 2023

(65) Prior Publication Data

US 2024/0240603 A1 Jul. 18, 2024

Related U.S. Application Data

(60) Provisional application No. 63/439,098, filed on Jan. 14, 2023.

(51) Int. Cl.

*F03B 11/02* (2006.01)
*F03B 7/00* (2006.01)
*F03B 13/00* (2006.01)
*F03B 15/04* (2006.01)

(52) U.S. Cl.

CPC .............. *F03B 11/025* (2013.01); *F03B 7/00* (2013.01); *F03B 13/00* (2013.01); *F03B 15/04* (2013.01)

(58) Field of Classification Search

CPC .......... F03B 11/025; F03B 7/00; F03B 13/00; F03B 15/04

See application file for complete search history.

(56) References Cited

U.S. PATENT DOCUMENTS 9,334,847 B2 5/2016 Harris
10,309,368 B2 6/2019 Hashimoto
2009/0309365 A1* 12/2009 Sauer ...................... F03B 13/12 290/53
2010/0230971 A1* 9/2010 Mackie ................. F03B 17/061 290/54
2012/0262036 A1 10/2012 Drews
2014/0284925 A1* 9/2014 Ross ....................... F03B 15/00 290/52
2019/0101095 A1 4/2019 Navarro
2019/0331084 A1 10/2019 Fridrich
2022/0220930 A1 7/2022 Nam

FOREIGN PATENT DOCUMENTS

CN 209908657 U * 1/2020
JP 4750830 B2 * 8/2011
KR 101594754 B1 * 2/2016 ............ Y02E 10/20
WO WO2014021472 2/2014
WO WO2022111738 6/2022

* cited by examiner

*Primary Examiner* — Woody A Lee, Jr.
*Assistant Examiner* — Eric A Lange

(57) ABSTRACT

A cover apparatus for directing a water current to rotate a waterwheel includes a shield comprising a first side panel, a second side panel, and a perimeter panel which define a cavity to receive the waterwheel. The cover apparatus is rotatably mountable to a shaft so that the cover apparatus rotates freely around the shaft to cover selected portions of the waterwheel. Typically, the shield covers one half of the waterwheel so that the water current only flows passed an uncovered half of the waterwheel to rotate the waterwheel. Fins are mounted to the perimeter panel to facilitate rotation of the shield around the waterwheel by the water current. An electricity generation system is described and claimed which uses the waterwheel and the cover apparatus.

17 Claims, 8 Drawing Sheets

COVER APPARATUS FOR DIRECTING WATER FLOW AROUND A WATERWHEEL

CROSS-REFERENCE TO RELATED APPLICATIONS

I hereby claim the benefit under 35 U.S.C. Section 119(e) of U.S. Provisional application 63/439,098 filed on Jan. 14, 2023.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to flow control apparatuses and more particularly pertains to a new flow control apparatus for directing a water current to rotate a waterwheel.

(2) Description of Related Art Including Information Disclosed Under 37 CFR 1.97 and 1.98

The prior art relates to flow control apparatuses for waterwheels. Various structures have been employed to help a water current rotate a waterwheel in one direction. For example, flaps have been pivotally mounted to waterwheels which act as a sail when water flows into the flap on a first side and which pivot out of the way of the water when the water flows into a second side of the flap opposite the first side. However, the prior art does not disclose a cover apparatus that freely rotates around a waterwheel to cover selected portions of the waterwheel and which comprise fins or similar structure which engage a flow of water to align the cover apparatus as desired.

BRIEF SUMMARY OF THE INVENTION

An embodiment of the disclosure meets the needs presented above by generally comprising a shield having a first side panel, a second side panel, and a perimeter panel. The perimeter panel is coupled to and extends between the first and second side panels. The shield defines a cavity surrounded by the first side panel, the second side panel, and the perimeter panel. The cavity has a size such that the shield is configured to receive a waterwheel into the cavity. The shield also has a rim defining an opening to the cavity formed by a free edge of the first side panel, a free edge of the second side panel, and a pair of end edges of the perimeter panel. Each of the first and second side panels has a hole extending therethrough so that the shield may be rotatably mounted around a shaft that is coupled to the waterwheel. The perimeter panel has a front portion and a rear portion. A fin is coupled to the rear portion of the perimeter panel and extends outwardly from the perimeter panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
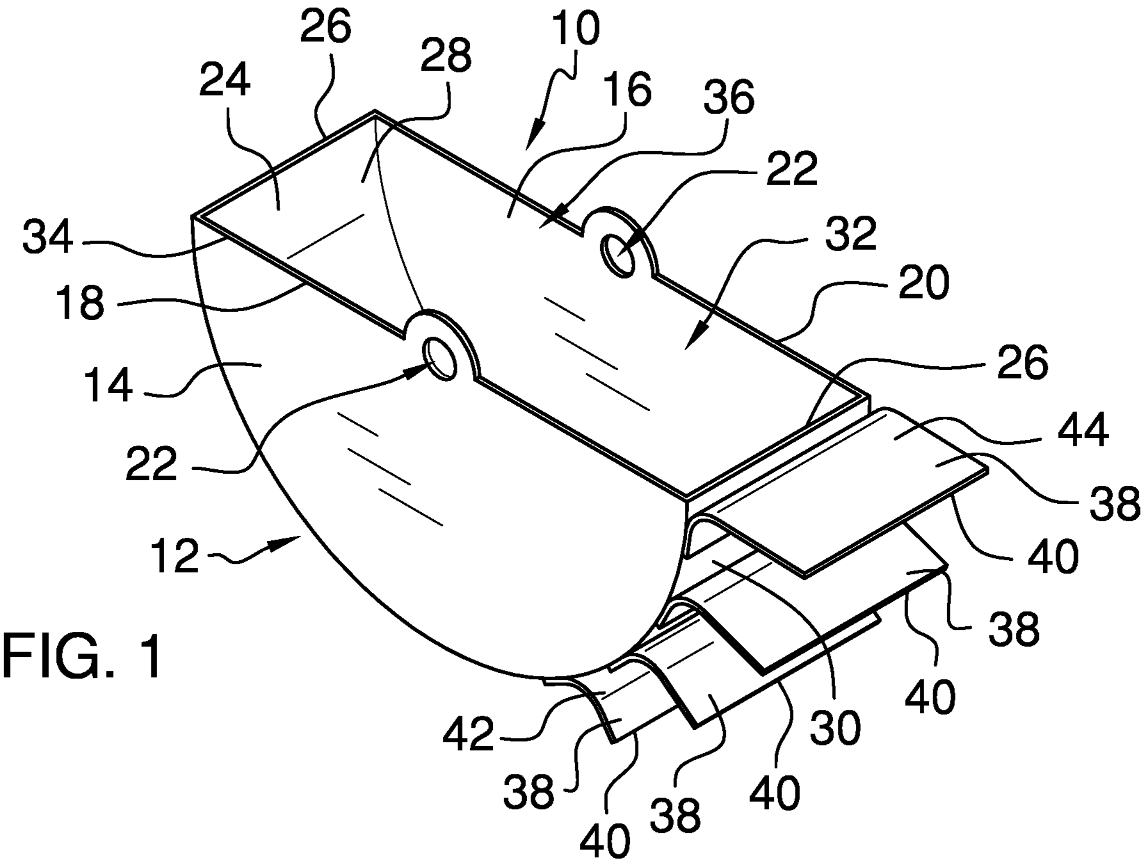
FIG. 1 is a perspective view of a cover apparatus according to an embodiment of the disclosure.
Figure 2:
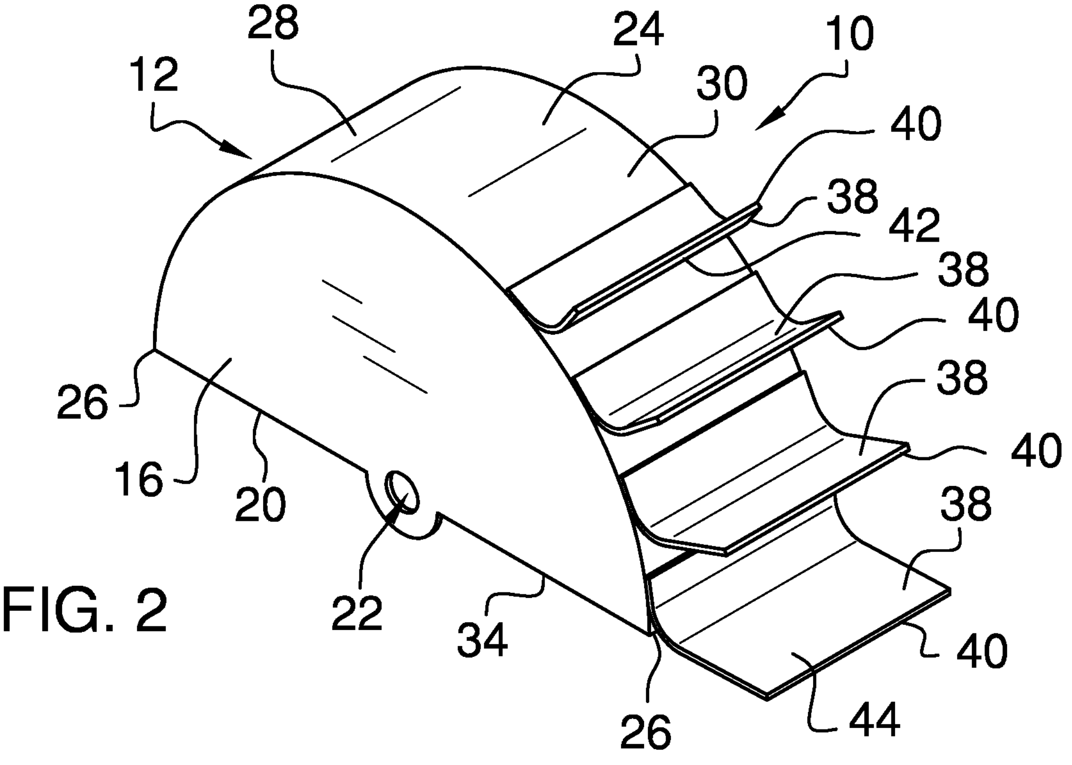
FIG. 2 is a perspective view of an embodiment of the disclosure.
Figure 3:
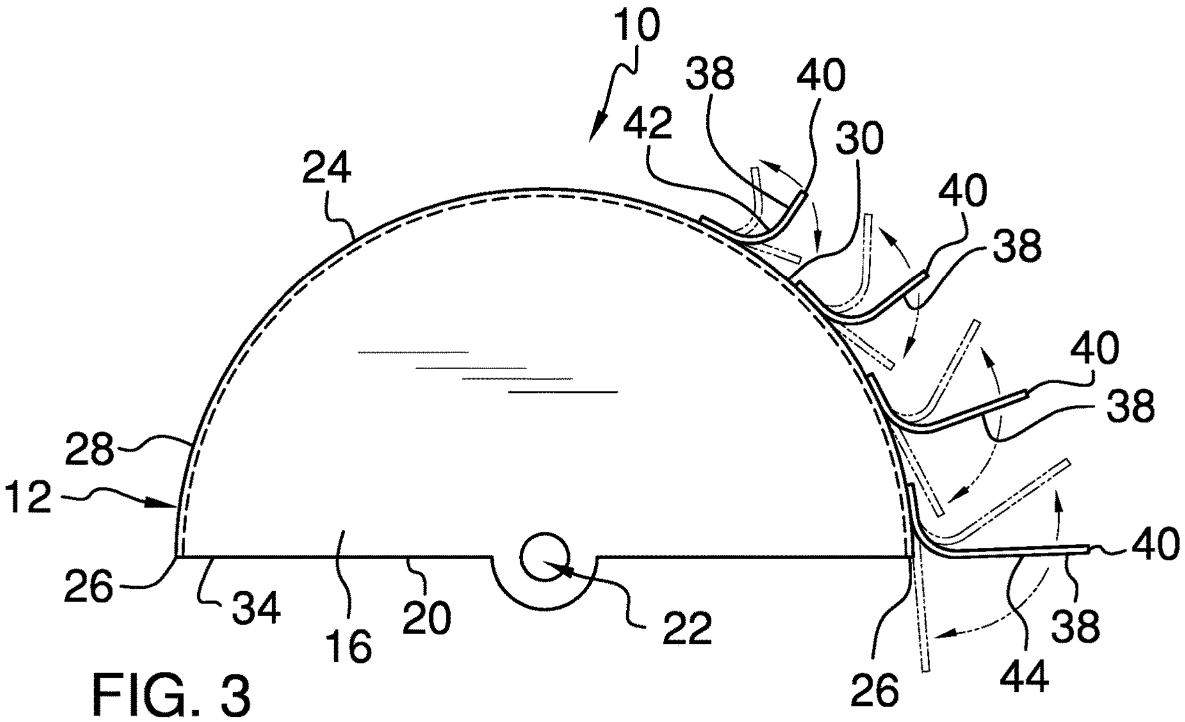
FIG. 3 is a side view of an embodiment of the disclosure.
Figure 4:
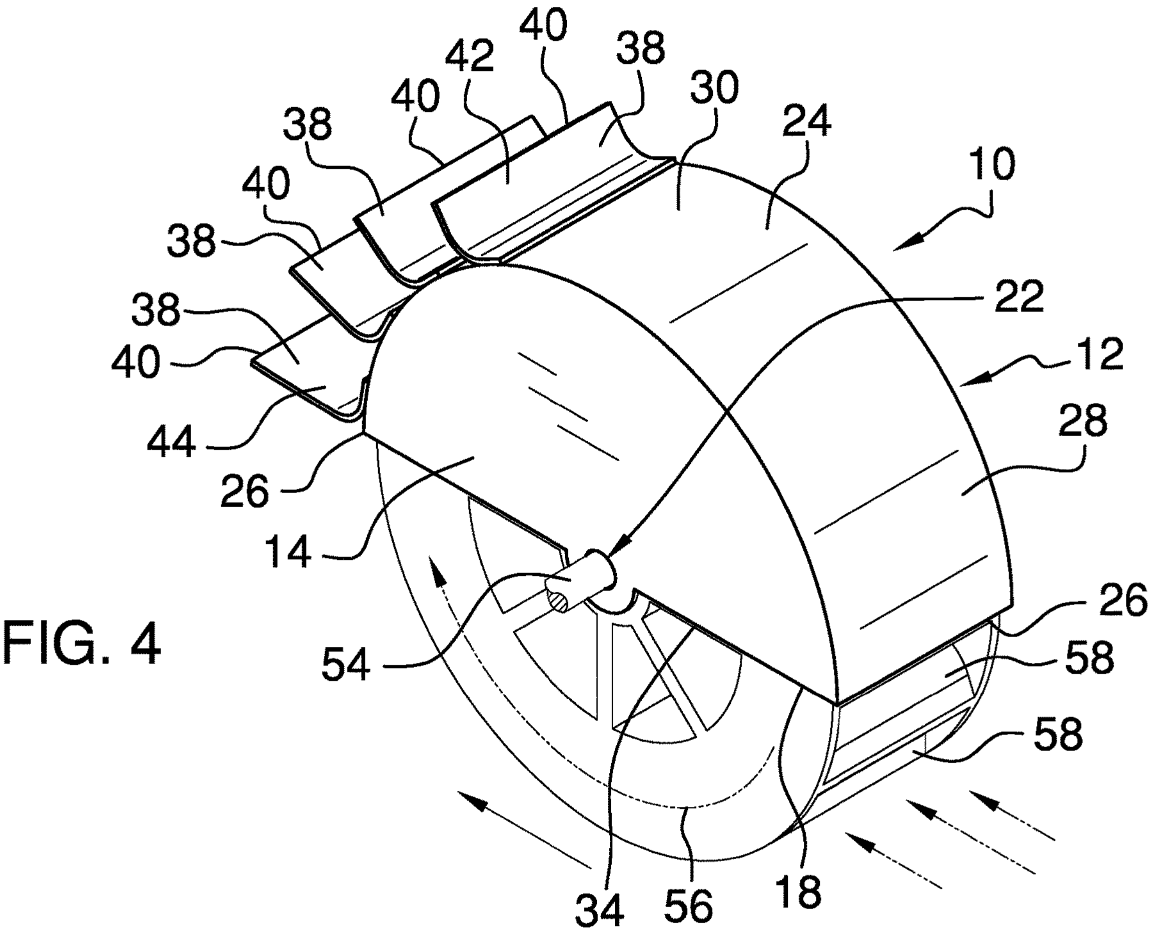
FIG. 4 is a perspective in-use view of an embodiment of the disclosure.
Figure 5:
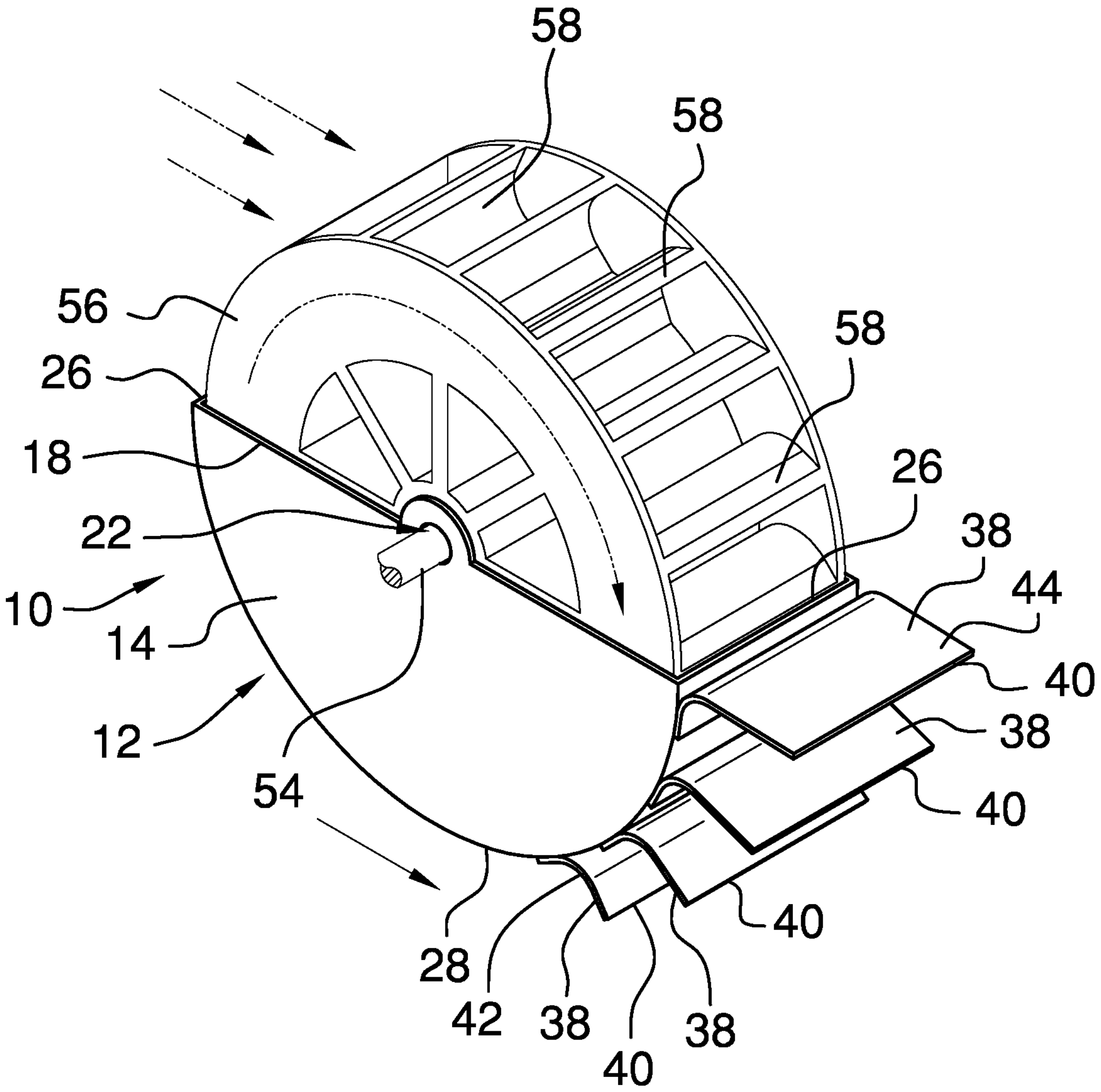
FIG. 5 is a perspective in-use view of an embodiment of the disclosure.

With reference now to the drawings, and in particular to FIGS. 1 through 12 thereof, a new flow control apparatus embodying the principles and concepts of an embodiment of the disclosure and generally designated by the reference numeral 10 will be described.

As best illustrated in FIGS. 1 through 12, the cover apparatus 10 generally comprises a shield 12 having a first side panel 14, a second side panel 16, and a perimeter panel 24. The perimeter panel 24 is coupled to and extends between the first and second side panels 14, 16. The shield 12 defines a cavity 32 surrounded by the first side panel 14, the second side panel 16, and the perimeter panel 24. The cavity 32 has a size such that the shield 12 is configured to receive a waterwheel 56 into the cavity 32. The shield 12 has a rim 34 which defines an opening 36 to the cavity 32 and is formed by a free edge 18 of the first side panel 14, a free edge 20 of the second side panel 16, and a pair of end edges 26 of the perimeter panel 24. Each of the first and second side panels 14, 16 has a hole 22 extending therethrough so that the shield 12 is rotatably mountable to a shaft 54 that is coupled to the waterwheel 56. In this manner, the shield 12 covers selected portions of the waterwheel 56 which change as the shield 12 rotates on the shaft 54 and around the waterwheel 56. The perimeter panel 24 has a front portion 28 and a rear portion 30, each of which is positioned adjacent to an associated end edge 26 of the pair of end edges 26 of the perimeter panel 24. The first and second side panels 14, 16 are planar and are oriented parallel to each other, and the perimeter panel 24 curves arcuately between the pair of end edges 26. The holes 22 of the first and second side panels 14, 16 are concentrically positioned relative to the perimeter panel 24 but may be eccentrically positioned in other embodiments.

A plurality of fins 38 is coupled to and extends outwardly from the perimeter panel 24 of the shield 12. The fins 38 are distributed along the perimeter panel 24 between the pair of end edges 26 and are positioned on the rear portion 30 of the perimeter panel 24. Each fin 38 of the plurality of fins 38 has a planar shape which is oriented perpendicularly to the first and second side panels 14, 16. Each fin 38 is also plastically bendable such that an angle between the fin 38 and the perimeter panel 24 is adjustable. In other embodiments, the angles of the fins 38 to the perimeter panel 24 may be adjusted by hinge joints which are retained in selected positions via fasteners, frictional engagements, or the like. Any suitable means for adjusting the angles may be used. Each fin 38 is orientable perpendicularly to the perimeter panel 24. Each fin 38 of the plurality of fins 38 has a length taken between the perimeter panel 24 and a distal edge 40 of the fin 38 with respect to the perimeter panel 24, and the lengths of the plurality of fins 38 become progressively larger from a frontmost fin 42 of the plurality of fins 38 to a rearmost fin 44 of the plurality of fins 38.

Figure 6:
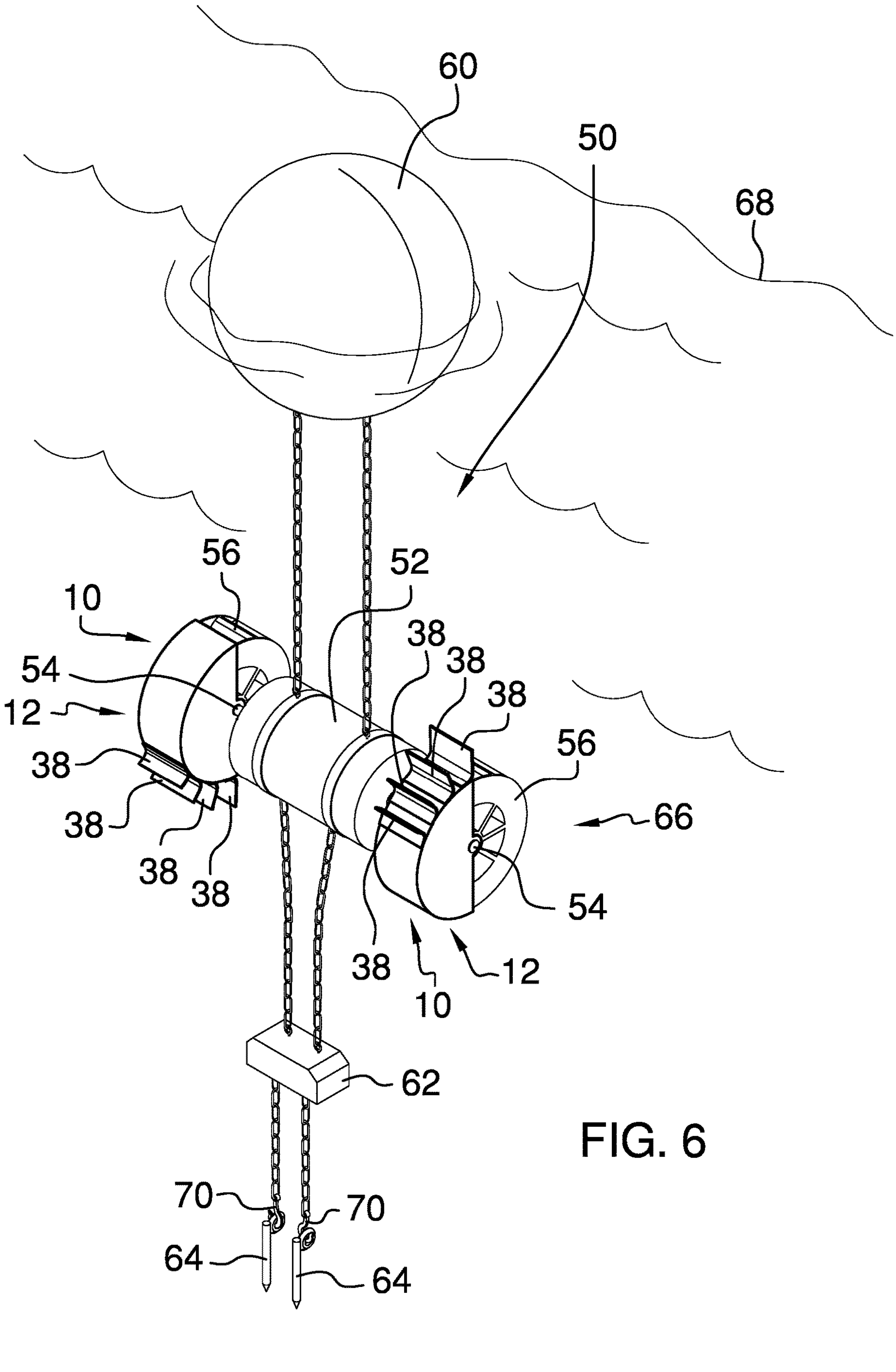
FIG. 6 is an in-use view of an embodiment of the disclosure.
Figure 7:
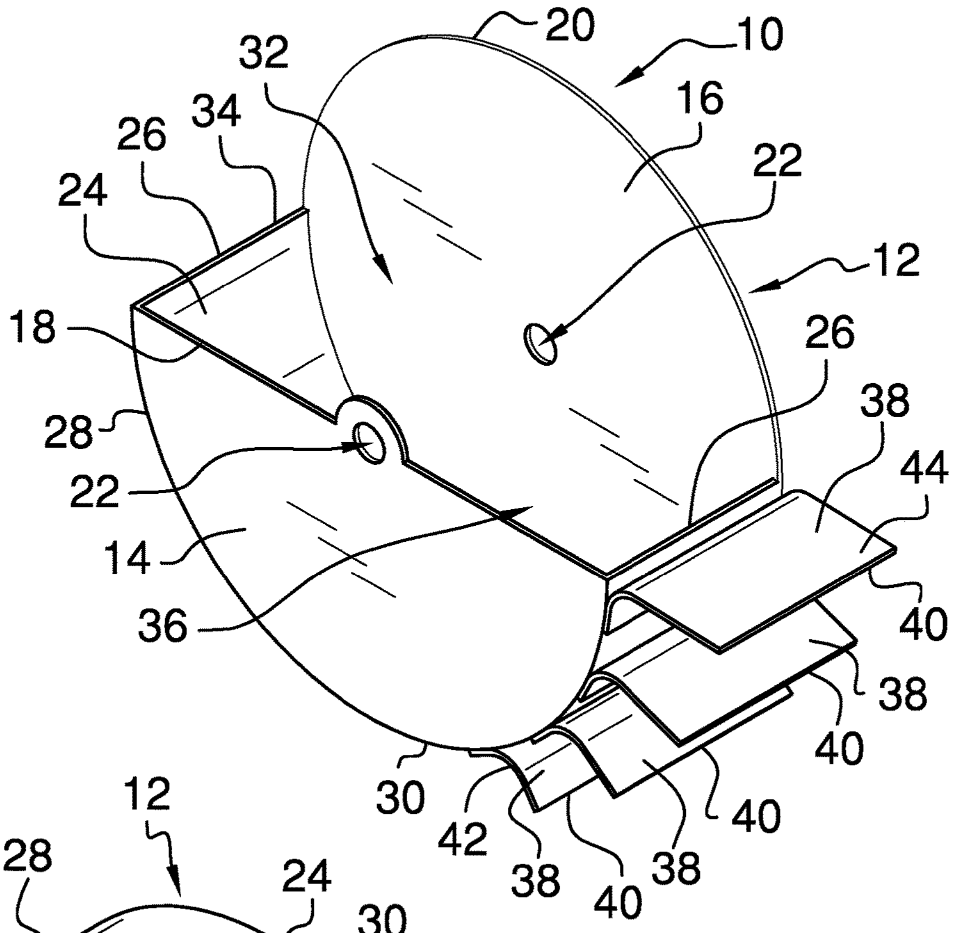
FIG. 7 is a perspective view of a second embodiment of the disclosure.
Figure 8:
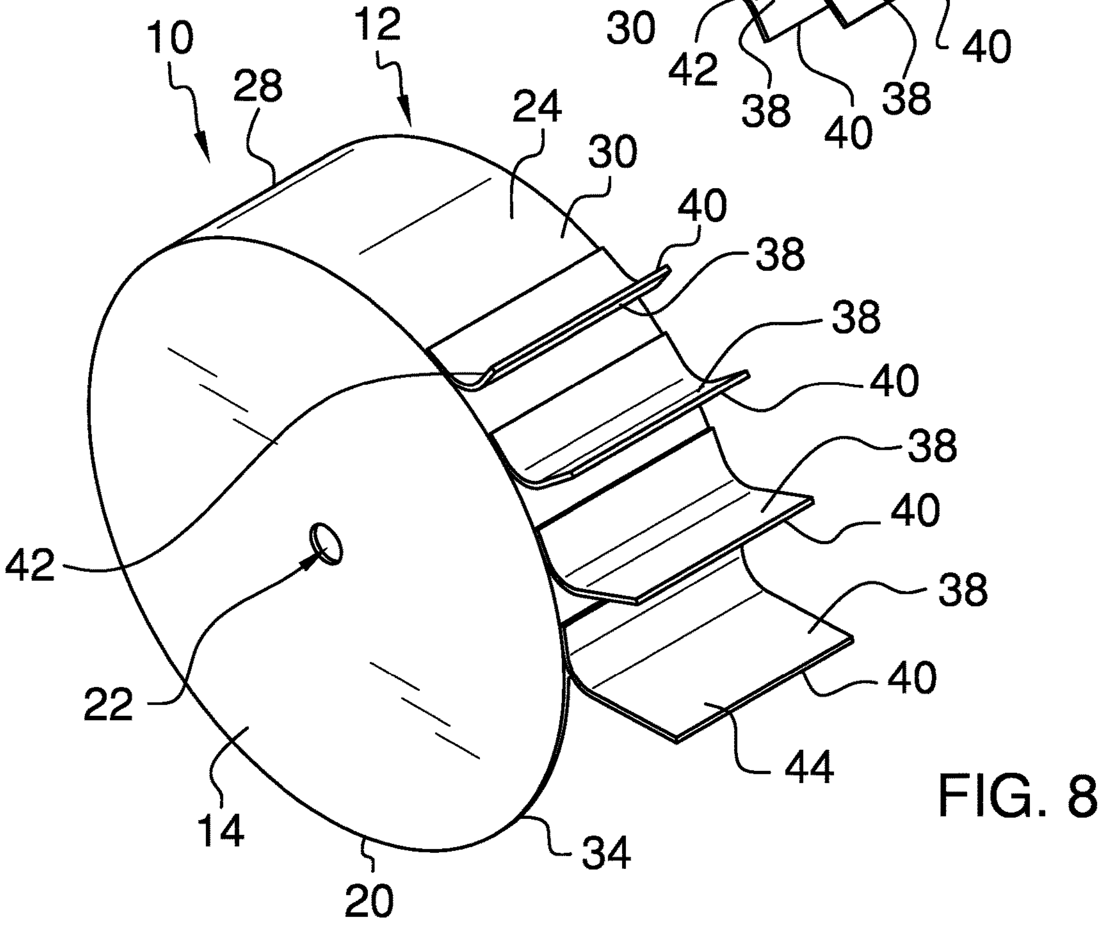
FIG. 8 is a perspective view of a second embodiment of the disclosure.
Figure 9:
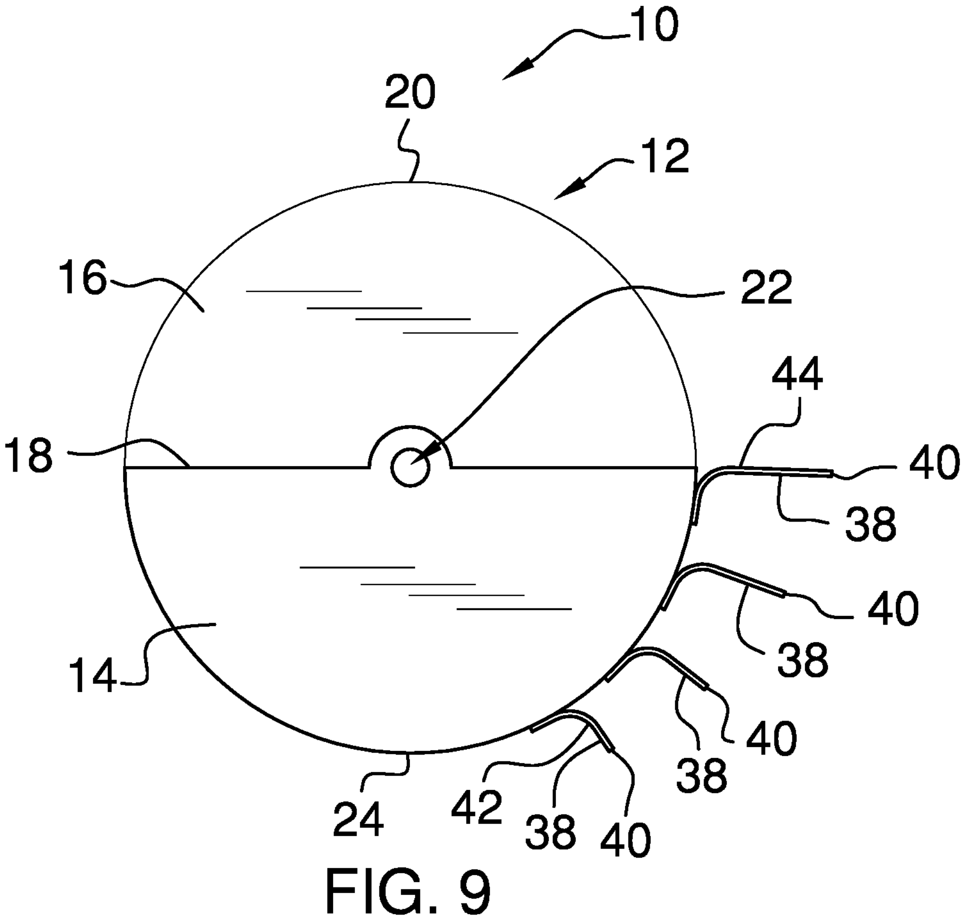
FIG. 9 is a side view of a second embodiment of the disclosure.

With reference to FIGS. 1 through 6, the first and second side panels 14, 16 have substantially semicircular shapes, and the rim 34 likes on a plane such that the shield 12 covers approximately half of the waterwheel 56. However, as shown in FIGS. 7 through 9, the first side panel 14 of another embodiment has a substantially semicircular shape while the second side panel 16 has a substantially circular shape. In this embodiment, the shield 12 still blocks water flow to approximately half of the waterwheel 56, but the second side panel 16 may provide further protection to the waterwheel 56 by covering a side of the waterwheel 56 which would otherwise be exposed during operation of the waterwheel 56.

Figure 10:
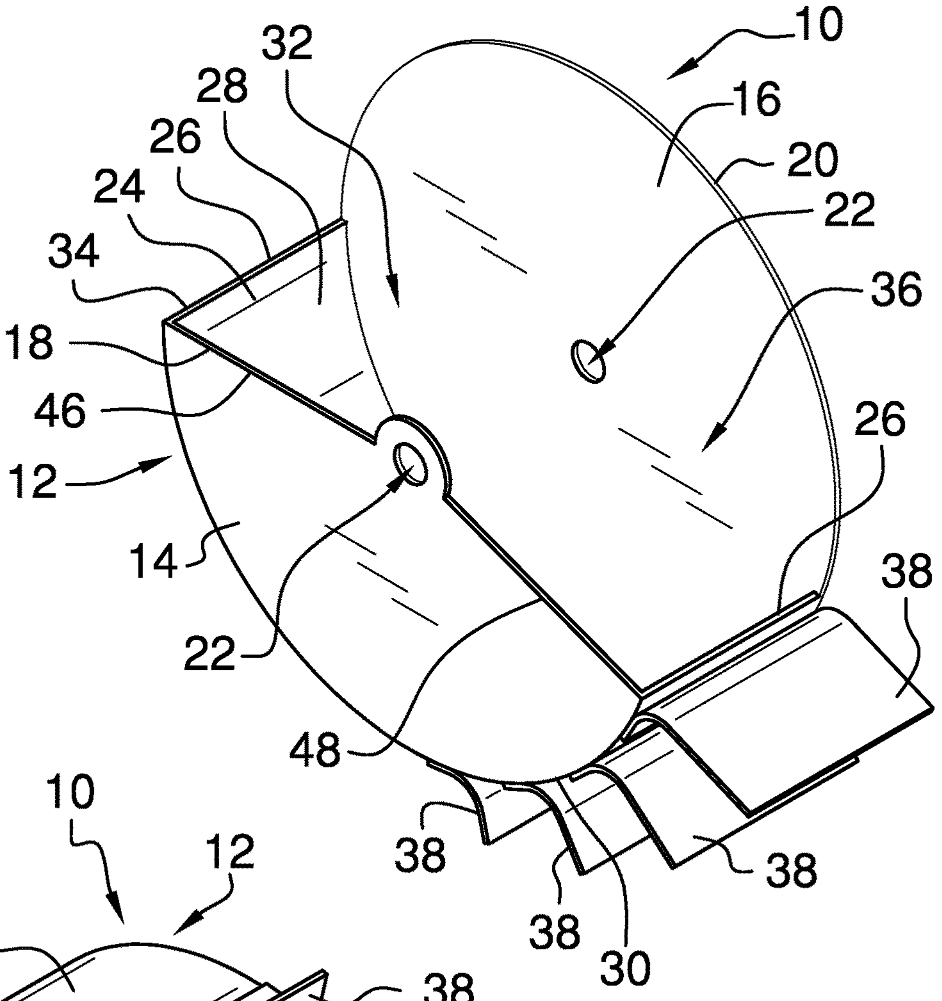
FIG. 10 is a perspective view of a third embodiment of the disclosure.
Figure 11:
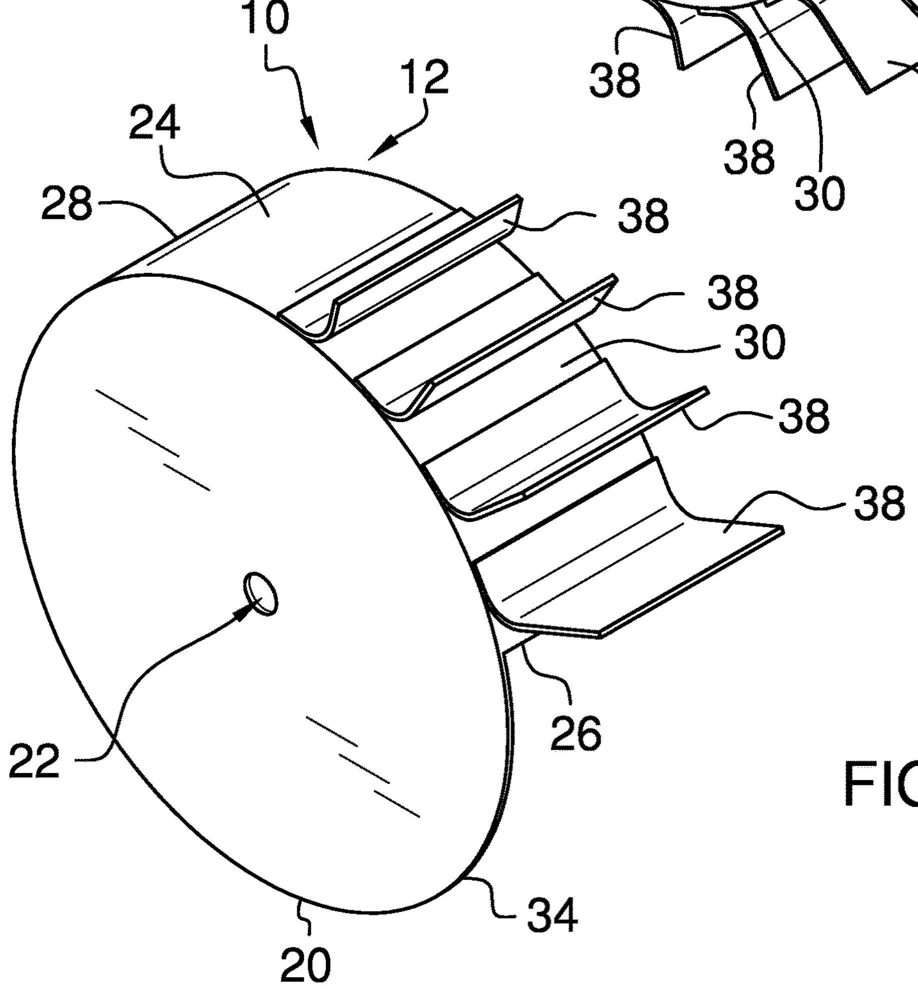
FIG. 11 is a perspective view of a third embodiment of the disclosure.
Figure 12:
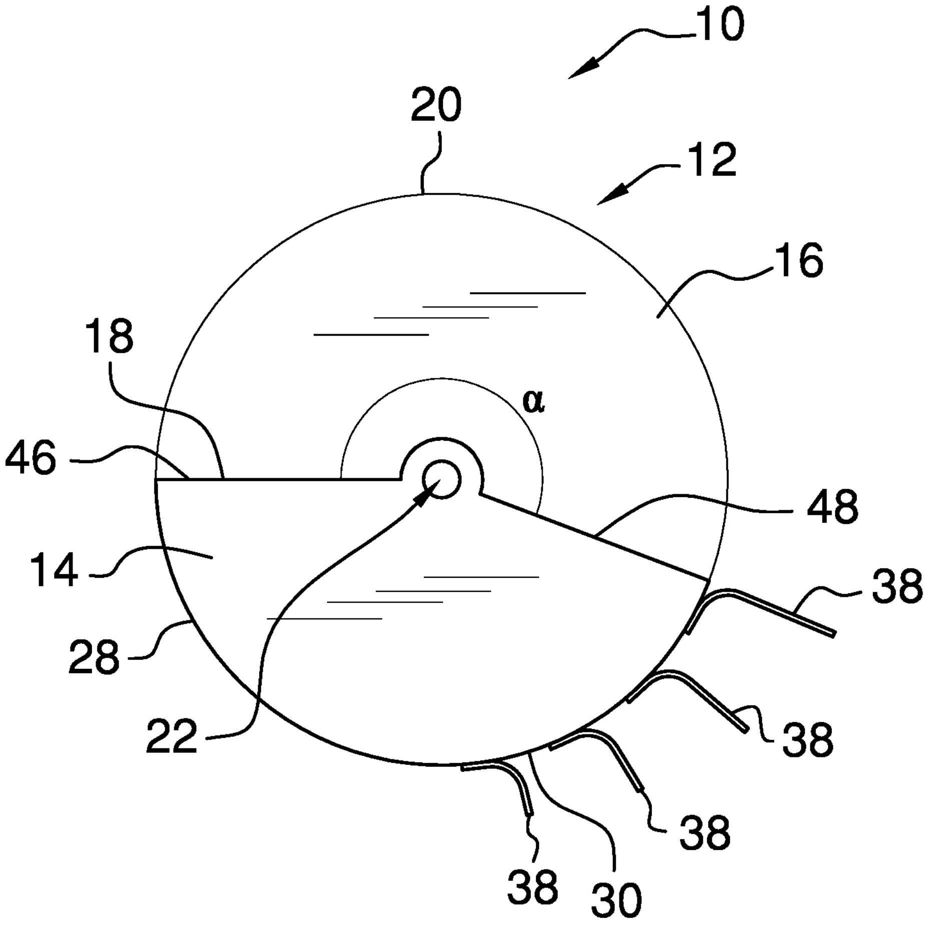
FIG. 12 is a side view of a third embodiment of the disclosure.

The rim 34 may also be divided into portions which are angularly offset from each other to expose or cover more of the waterwheel 56 as may be optimal for various water flow conditions. For example, as seen in FIGS. 10 through 12, a rear section 48 of the free edge 18 of the first side panel 14 forms an obtuse angle (a) with a front section 46 of the free edge 18 of the first side panel 14 to expose more of the waterwheel 56 than the embodiments shown in FIGS. 1 through 6 and 7 through 9. This embodiment also shows the second side panel 16 having a substantially circular shape similar to the embodiment shown in FIGS. 7 through 9.

The cover apparatus 10 may be mounted in an electricity generation system 50. Such a system is depicted in FIG. 6, and comprises a generator 52 configured for generating electricity from kinetic energy of a rotor (not shown). A pair of shafts 54 are coupled to the rotor on opposite sides of the generator 52, and the shafts 54 extend in opposite directions from each other away from the generator 52. Each shaft 54 has a waterwheel 56 mounted thereon with radially arranged paddles 58 for rotating the waterwheel 56 via a water current. A pair of cover apparatuses 10 are provided, with each cover apparatus 10 being mounted rotatably on an associated shaft 54 of the pair of shafts 54 and positioned to partially cover an associated one of the waterwheels 56.

A float 60 is tethered to the generator 52 to suspend the generator 52 in a body of water 66 below a surface 68 of the body of water 66. A weight 62 is tethered to the generator 52 to retain the generator 52 below the surface 68 of the body of water 66. A pair of piles 64 are tethered to the weight 62 to secure the generator 52 to a selected area of a ground surface 68 below the body of water 66. In some embodiments of the electricity generation system 50, the weight 62 may be removably coupled to the piles 64 via hooks 70 which insert through loops formed on the piles 64 or any other suitable fastening means, including clamps, threaded fasteners, ties or the like.

In use, when water currents catch on the fins 38 to orient the cover apparatus 10 such that the rear portion 30 of the perimeter panel 24 of the shield 12 is positioned downstream of the front portion 28. In this position, the cover apparatus 10 acts to block water from flowing against approximately one half of the waterwheel 56 and exposes another half of the waterwheel 56 to the current. The water current is then able to urge the exposed half of the waterwheel 56 to move the waterwheel 56 in one rotational direction while being prevented from counteracting this motion by urging the covered half of the waterwheel 56 in another rotational direction opposite the one rotational direction. The generator 52 may therefore be operated by shifting water currents without such currents also counteracting productive rotations of the waterwheel 56.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cover apparatus for directing water flow around a waterwheel, the cover apparatus comprising:

a shield comprising a first side panel, a second side panel, and a perimeter panel, the perimeter panel being coupled to and extending between the first and second side panels, the shield defining a cavity surrounded by the first side panel, the second side panel, and the perimeter panel, the cavity having a size such that the shield is configured to receive the waterwheel into the cavity, the shield having a rim formed by a free edge of the first side panel, a free edge of the second side panel, and a pair of end edges of the perimeter panel, the rim defining an opening to the cavity, each of the first and second side panels having a hole extending therethrough, the holes of the first and second side panels having a size such that the holes are configured to rotatably mount the shield to a shaft, the perimeter panel having a front portion and a rear portion; and a plurality of fins coupled to and extending outwardly from the perimeter panel of the shield, the plurality of fins being distributed along the perimeter panel between the pair of end edges, an entirety of the plurality of fins being positioned exclusively on the rear portion of the perimeter panel.

2. The apparatus of claim 1, wherein each fin of the plurality of fins has a length taken between the perimeter panel and a distal edge of the fin with respect to the perimeter panel, the lengths of the plurality of fins being progressively larger from a frontmost fin of the plurality of fins to a rearmost fin of the plurality of fins.

3. The apparatus of claim 1, wherein:

the first and second side panels are planar and are oriented parallel to each other; and each fin has a planar shape oriented perpendicularly to the first and second side panels.

4. The apparatus of claim 3, wherein each fin is orientable perpendicularly to the perimeter panel.

5. The apparatus of claim 1, wherein the perimeter panel curves arcuately between the pair of end edges.

6. The apparatus of claim 1, wherein an angle between each fin and the perimeter panel is adjustable.

7. The apparatus of claim 1, wherein the first and second side panels of the shield have substantially semicircular shapes.

8. The apparatus of claim 1, wherein the first side panel has a substantially semicircular shape and the second side panel has a substantially circular shape.

9. The apparatus of claim 1, wherein a rear section of the free edge of the first side panel forms an obtuse angle with a front section of the free edge of the first side panel.

10. A cover apparatus for directing water flow around a waterwheel, the cover apparatus comprising:

a shield comprising a first side panel, a second side panel, and a perimeter panel, the perimeter panel being coupled to and extending between the first and second side panels, the shield defining a cavity surrounded by the first side panel, the second side panel, and the perimeter panel, the cavity having a size such that the shield is configured to receive the waterwheel into the cavity, the shield having a rim formed by a free edge of the first side panel, a free edge of the second side panel, and a pair of end edges of the perimeter panel, the rim defining an opening to the cavity, each of the first and second side panels having a hole extending therethrough, the holes of the first and second side panels having a size such that the holes are configured to rotatably mount the shield to a shaft, the perimeter panel having a front portion and a rear portion, the first and second side panels being planar and being oriented parallel to each other, the perimeter panel curving arcuately between the pair of end edges; and a plurality of fins coupled to and extending outwardly from the perimeter panel of the shield, the plurality of fins being distributed along the perimeter panel between the pair of end edges, the plurality of fins being positioned on the rear portion of the perimeter panel, each fin of the plurality of fins having a planar shape oriented perpendicularly to the first and second side panels, each fin of the plurality of fins being plastically bendable such that an angle between the fin and the perimeter panel is adjustable, each fin being orientable perpendicularly to the perimeter panel, each fin of the plurality of fins having a length taken between the perimeter panel and a distal edge of the fin with respect to the perimeter panel, the lengths of the plurality of fins being progressively larger from a frontmost fin of the plurality of fins to a rearmost fin of the plurality of fins; and wherein an entirety of the plurality of fins being positioned exclusively on the rear portion of the perimeter panel.

11. The apparatus of claim 10, wherein the first and second side panels of the shield have substantially semicircular shapes.

12. The apparatus of claim 10, wherein the first side panel has a substantially semicircular shape and the second side panel has a substantially circular shape.

13. The apparatus of claim 12, wherein a rear section of the free edge of the first side panel forms an obtuse angle with a front section of the free edge of the first side panel.

14. An electricity generation system comprising:

a generator configured for generating electricity from kinetic energy of a rotor;

a shaft coupled to the rotor;

a waterwheel mounted on the shaft, the waterwheel having radially arranged paddles for rotating the waterwheel via a water current;

a cover apparatus rotatably mounted on the shaft, the cover apparatus being positioned to partially cover the waterwheel, the cover apparatus comprising:

a shield comprising a first side panel, a second side panel, and a perimeter panel, the perimeter panel being coupled to and extending between the first and second side panels, the shield defining a cavity surrounded by the first side panel, the second side panel, and the perimeter panel, the shield receiving the waterwheel into the cavity, the shield having a rim formed by a free edge of the first side panel, a free edge of the second side panel, and a pair of end edges of the perimeter panel, the rim defining an opening to the cavity, each of the first and second side panels having a hole extending therethrough for receiving the associated shaft, the perimeter panel having a front portion and a rear portion; and a plurality of fins coupled to and extending outwardly from the perimeter panel of the shield, the plurality of fins being distributed along the perimeter panel between the pair of end edges;

a float tethered to the generator to suspend the generator in a body of water below a surface of the body of water; and wherein an entirety of the plurality of fins being positioned exclusively on the rear portion of the perimeter panel.

15. The system of claim 14, further comprising a weight tethered to the generator to retain the generator below the surface of the body of water.

16. The system of claim 15, further comprising at least one pile being tethered to the weight to secure the generator to a selected area of a ground surface below the body of water.

17. The system of claim 14, wherein:

the shaft is one of a pair of shafts coupled to the rotor, each shaft of the pair of shafts extending away from the rotor in opposite directions;

the waterwheel is one of a pair of waterwheels, each waterwheel of the pair of waterwheels being mounted on an associated shaft of the pair of shafts, each waterwheel of the pair of waterwheels having radially arranged paddles for rotating the waterwheel via a water current; and the cover apparatus is one of a pair of cover apparatuses, each cover apparatus of the pair of cover apparatuses being rotatably mounted on an associated shaft of the pair of shafts, each cover apparatus of the pair of cover apparatuses being positioned to partially cover an associated waterwheel of the pair of waterwheels, each cover apparatus of the pair of cover apparatuses comprising:

a shield comprising a first side panel, a second side panel, and a perimeter panel, the perimeter panel being coupled to and extending between the first and second side panels, the shield defining a cavity surrounded by the first side panel, the second side panel, and the perimeter panel, the shield receiving the waterwheel into the cavity, the shield having a rim formed by a free edge of the first side panel, a free edge of the second side panel, and a pair of end edges of the perimeter panel, the rim defining an opening to the cavity, each of the first and second side panels having a hole extending therethrough for receiving the associated shaft, the perimeter panel having a front portion and a rear portion; and a plurality of fins coupled to and extending outwardly from the perimeter panel of the shield, the plurality of fins being distributed along the perimeter panel between the pair of end edges.

* * * * *